2 Sheets--Sheet 2.
J. E. CRANE.
Beater for Cotton Openers.
No. 165,066. Patented June 29, 1875.
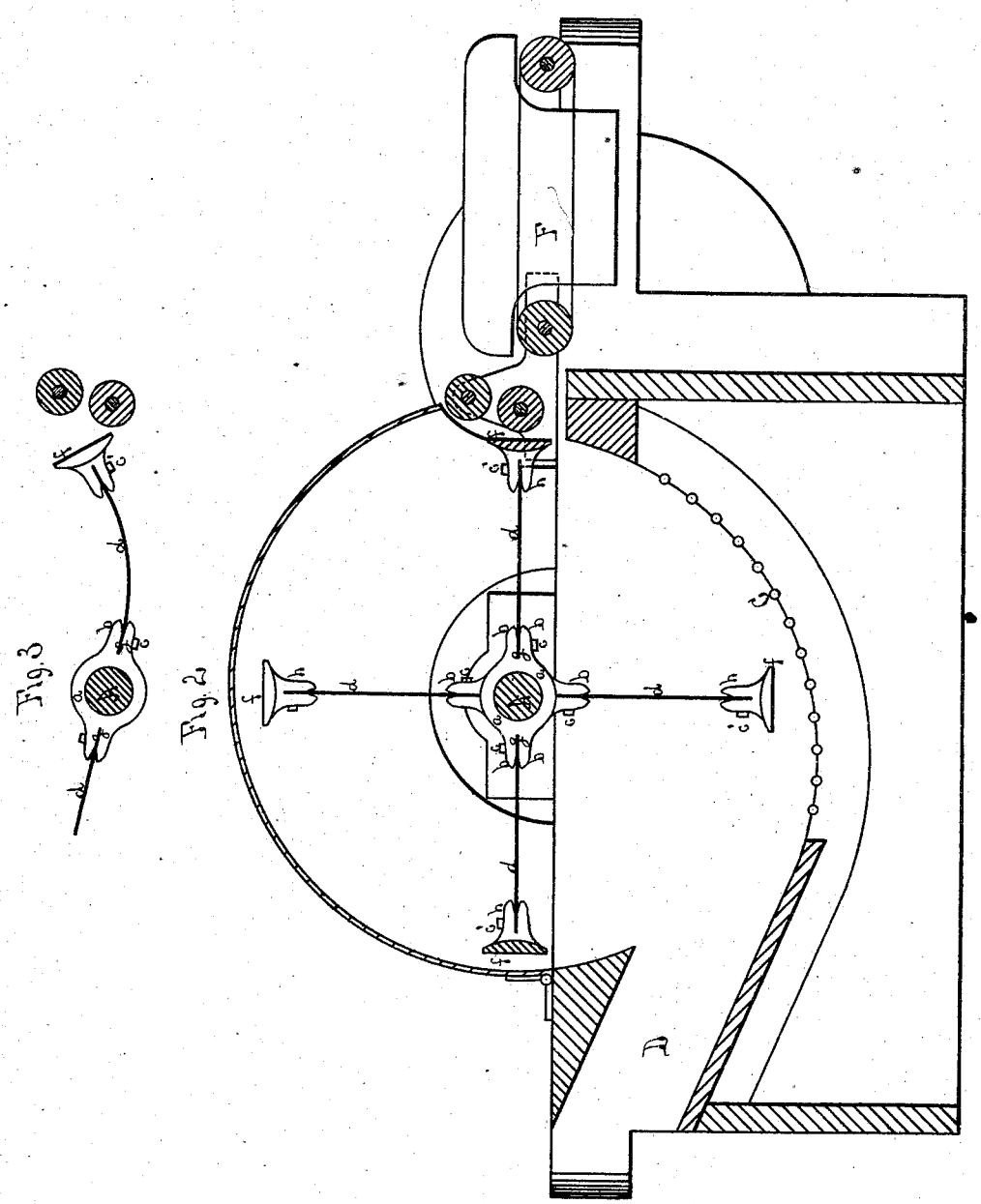
Witnesses.
Nathan Brown
Wm S Brown
Inventor.
John E Crane

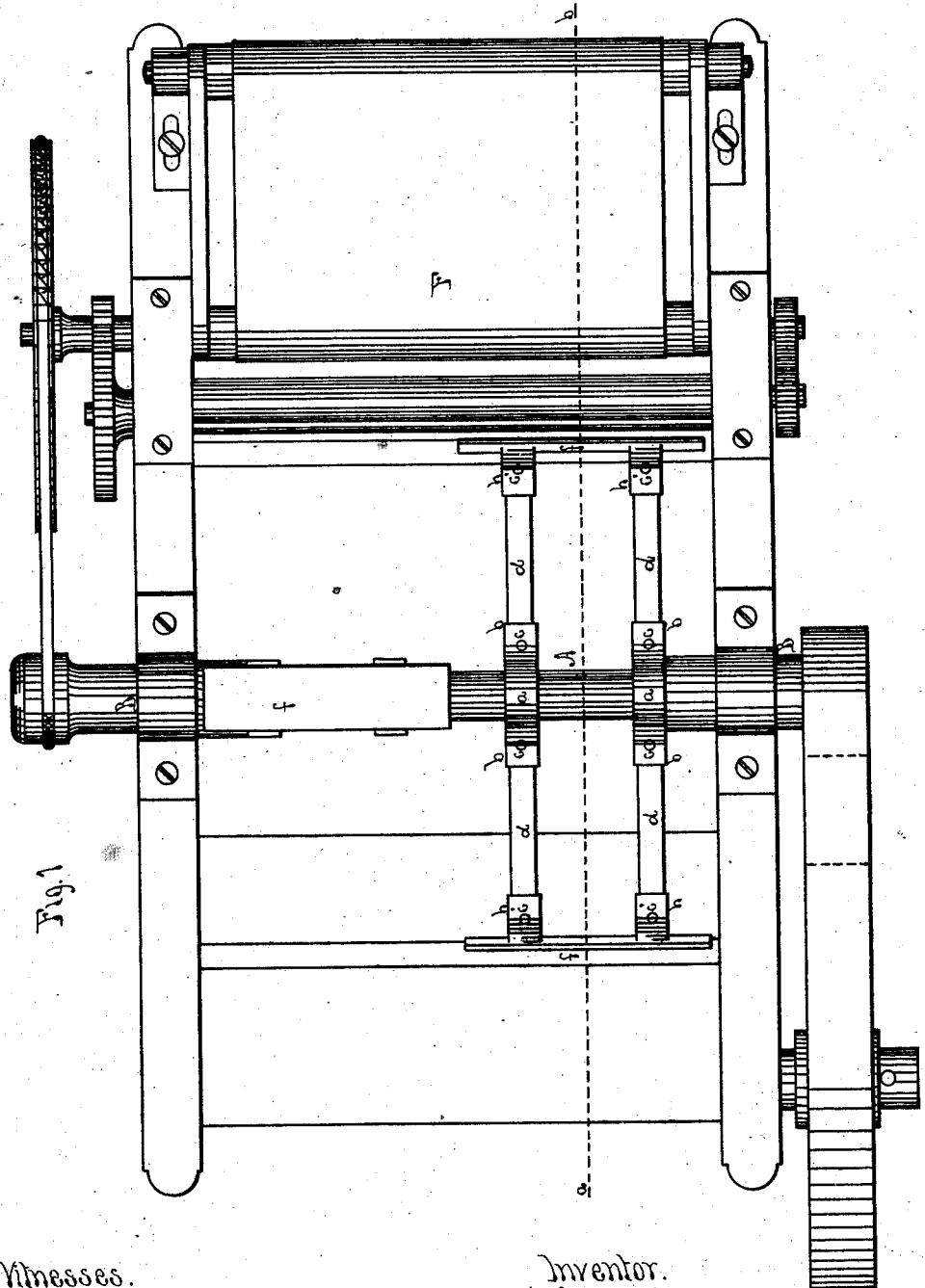

UNITED STATES PATENT OFFICE.

JOHN E. CRANE, OF LOWELL, MASSACHUSETTS.

IMPROVEMENT IN BEATERS FOR COTTON-OPENERS.

Specification forming part of Letters Patent No. 165,066, dated June 29, 1875; application filed April 2, 1875.

*To all whom it may concern:*

Be it known that I, JOHN E. CRANE, of Lowell, in the county of Middlesex and State of Massachusetts, have invented certain new and useful Improvements in Cotton-Openers, of which the following is a full, clear, and exact description, reference being had to the accompanying drawings, making part of this specification, in which—

Figure 1 represents a plan or top view after the top cover or bonnet has been removed. Fig. 2 represents a sectional elevation on the line $a\,b$ of Fig. 1. Fig. 3 represents detached details, showing one of the spring-arms and its connected beater-blade as they appear at times when in action.

This invention relates to yielding beaters for cotton-openers; and it consists in the combination of the beater-blades with spring-arms by hanging the former upon the outer ends of the latter, so that the blades will yield by the flexibility or spring action of the arms when striking any hard substance passing between the feed-rolls, and the striking edges of the blades will revolve in substantially the same circle when they yield as when they do not yield, and pass by the feed-rolls and the grate or rack beneath the beater at the same distance therefrom as if rigid; the spring-arms, bending to give the yielding action to the beater-blades, and the blades canting or turning at an angle, and thereby throwing out their striking edges toward the feed-rolls, and from their axis of rotation, compensate for the shortening of the arms by bending to give the yielding action to the beaters, and thus the striking edges of the blades revolve and strike at all times in the same circle, and at the same distance from the feed-rolls and the cotton passing between them.

In the said drawings, A represents the central axis or main shaft, having journals B supported and revolving in bearings on the frame, cased up in the usual way, and provided with a common screen or rack, C, beneath the beaters, and a delivery-trunk or spout, D; a common feed-apron, F, and well-known feed connecting and operating mechanism, which may be driven from a pulley on one end of the main shaft, as shown. To the central portion of the shaft A I apply certain fixed hubs $a$, constructed with radial wings or projections $b$, which are slotted, as shown at $g$, for the reception of one end of each radial spring-arm $d$, secured by a screw or screws, $c$, passing through the wing and the arm. To the outer end of each pair of said spring-arms I affix a beater-blade, $f$, by means of slotted flanges or inner projections $h$, the outer end of each arm entering a slot, and secured by a screw or screws, $c'$, passing through the flange and the arm. The form of each blade $f$ is like or similar to the common rigid beater-blade, except the inner flanges $h$, and each blade should be hung upon two arms, whether made in two or more sections or lengths, or a single blade covering the whole length of the feed-rolls. It will be understood that the action of these spring-arm beaters will be different from the action of certain hinged beaters in this particular: When the hinged beaters, which are hinged to lugs or arms projecting beyond the shaft, or to the periphery of the shaft or drum which carries them, yield to their blows, and the bunches of cotton struck by them, their operating ends or blades fall back toward their axes and from the feed-rolls, leaving apertures or openings for bunches of cotton to pass between the feed-rolls and each fallen-back beater; but when these said spring-arm beaters yield to their blows, and the bunches of cotton struck by them, the blades instantly react, as soon as they strike the fed cotton, and again come forward in the same circular line, and by the canting or turning of the blades to compensate for the shortening of the arms, the striking edges of the blades always maintain the same distance from the feed-rolls and the rack C; but these said spring-arm beaters yield sufficient to relieve them when they strike bunches of cotton, or cotton in a matted condition, and by this construction and their great length of leverage from their inner connections with the winged hubs $a$ to the striking edges of the blades will do greater execution in opening cotton than most of the hinged beaters for cotton-openers, and cotton struck or acted upon by these said spring-arm beaters will be carried forward and opened by them, as such cotton passes the feed-rolls as perfectly as if the beaters were rigid, and no cotton will pass the said spring-arm beaters without being acted upon by them.

I claim as my invention—

The combination of the beater-blades and the spring-arms, the two being connected together as described, so that the blades may be allowed to yield by the spring action of the arms, and the striking edges to cant or turn and strike at all times in the same circle, substantially as set forth.

JOHN E. CRANE.

Witnesses:
NATHAN BROWN,
WM. S. BROWN.